United States Patent [19]

Urasaka et al.

[11] Patent Number: 5,530,745
[45] Date of Patent: Jun. 25, 1996

[54] CORDLESS TELEPHONE APPARATUS

[75] Inventors: Shinichi Urasaka; Takeharu Sakata, both of Tottori, Japan

[73] Assignees: Sanyo Electric Co., Ltd., Osaka-Fu; Tottori-Ken Sanyo Electric Co., Ltd., Tottori-Ken, both of Japan

[21] Appl. No.: 513,502

[22] Filed: Aug. 10, 1995

Related U.S. Application Data

[62] Division of Ser. No. 350,021, Nov. 29, 1994.

[30] Foreign Application Priority Data

| Nov. 29, 1993 | [JP] | Japan | 5-298317 |
| Jun. 16, 1994 | [JP] | Japan | 6-134404 |
| Jul. 14, 1994 | [JP] | Japan | 6-162255 |

[51] Int. Cl.⁶ ................................................. H04M 1/56
[52] U.S. Cl. ............................ 379/355; 379/354; 379/58
[58] Field of Search ............................ 379/58, 61, 354, 379/355

[56] References Cited

U.S. PATENT DOCUMENTS 5,267,308  11/1993  Jokinen et al. ..................... 379/355

FOREIGN PATENT DOCUMENTS

| 0219859 | 12/1983 | Japan | 379/355 |
| 0191446 | 8/1988 | Japan | 379/354 |
| 0278451 | 11/1988 | Japan | 379/355 |
| 0089846 | 4/1989 | Japan | 379/354 |

*Primary Examiner*—Dwayne D. Bost
*Attorney, Agent, or Firm*—Nikaido, Marmelstein, Murray & Oram

[57] ABSTRACT

In a cordless telephone apparatus including a base unit and a sub unit connected with each other by wireless, the base unit has a memory for storing therein telephone number data which are referred to from the sub unit. When the base unit is busy, the transfer of a calling signal between the sub and base units is not performed. The access from the sub unit to the memory of the base unit is always permitted. The memory includes a callers area in which the telephone numbers of callers of received calls and the reception times of the calls are stored and a directory area in which frequently called telephone numbers and the number of placing calls of the numbers are stored. The telephone numbers in the callers area are retrieved based on the reception times. The telephone numbers in the directory area are retrieved based on the numbers of placing calls. By adding the number of placing calls of the telephone number stored in the callers area to the number of placing calls of the telephone number stored in the directory area, the telephone number retrieval from the directory area functions correctly. Moreover, by using the cordless telephone apparatus as a terminal apparatus of a private telephone system, data stored in a main apparatus of the system are referred to from the sub unit of the terminal apparatus.

2 Claims, 13 Drawing Sheets

CORDLESS TELEPHONE APPARATUS

This is a divisional, of application Ser. No. 08/350,021 filed Nov. 29, 1994.

BACKGROUND OF THE INVENTION

1. Field of the Invention

The present invention relates to a cordless telephone apparatus including a base unit and a sub unit connected with each other by wireless, and more particularly, to a telephone apparatus provided with a function to retrieve and transmit telephone number data stored in the apparatus.

2. Description of the Prior Art

In recent years, a cordless telephone apparatus has rapidly been spreading which includes a base unit connected to the telephone line and a sub unit connected to the base unit by wireless. In such a telephone apparatus, calls can be made with the sub unit at a place away from the base unit by connecting the sub unit to the telephone line through the base unit.

Generally, the base unit is also provided with the transmitting and receiving functions, so that calls can be made not only with the sub unit but also with the base unit. In this case, to protect the privacy, it is necessary to take some measures to prevent the contents of calls made with the base or sub unit from being monitored through the other unit. For this purpose, for example, Japanese Published Patent Application H4-8983 discloses a cordless telephone apparatus where the access from the sub unit is inhibited when the base unit is busy.

A telephone apparatus is widely used which has a directory function to reduce the number of operations for calling by registering and storing a plurality of frequently called telephone numbers in the telephone apparatus and retrieving a registered telephone number by a few key operations. With such a telephone apparatus, the time required for the connection to the telephone lines is reduced and the mis-input of telephone numbers is prevented, so that calling is efficiently performed. The telephone numbers to be registered are stored in a rewritable memory area called a directory area, and modifications such as addition, change and deletion can be made by the user.

A telephone apparatus has also spread which has a callers function to store callers' telephone numbers. At a switching station in a telephone service facility, the telephone number data of the caller is transmitted during a dormant period when the reception signal is transmitted to the receiver. The telephone apparatus of the receiver receives and automatically stores the telephone number data. The callers' telephone numbers are stored in a memory area called a callers area and displayed by an operation by the user. Thereby, the user can find the telephone number of a caller who made a call in the user's absence. Further, the displayed telephone number can be used to place a call, so that it is unnecessary to input the number. A plurality of numbers can be stored, and the addition and deletion of numbers are possible since the callers area is also rewritable.

When a cordless telephone apparatus is provided with the function to store telephone numbers, the callers area and the directory area are normally provided in the base unit. The display for displaying a telephone number is usually provided in the sub unit which is more frequently used. Thus, the user accesses the memory area of the base unit from the sub unit to refer to the telephone numbers stored therein. Since the sub unit is desirably small-sized and lightweight, the size of the display provided in the sub unit is reduced to the extent that information on one telephone number can be displayed.

In such an arrangement, the base unit receives a telephone number reference request from the sub unit, and retrieves one telephone number from the memory area to transmit the number. In the sub unit, the number transmitted from the base unit is displayed by the display. When the telephone number is not the necessary one, the user transmits a reference request again. The base unit retrieves another telephone number and transmits it. This operation is repeated until the necessary telephone number is displayed.

As the method to retrieve a telephone number in the directory area, for example, the following methods are known: a method as disclosed in Japanese Laid-open Patent Application No. S64-89847 where a key word such as the name is stored together with the telephone number and the telephone number is retrieved with reference to the key word; and a method as disclosed in Japanese Laid-open Patent Application No. H3-171857 where the telephone numbers are divided into groups.

According to these methods, however, since more frequently called telephone numbers are not always retrieved sooner, the retrieval takes a long time, and many steps of operations are required. To solve this problem, the Applicant of the present invention proposes in Japanese Laid open Patent Application No. H4-144345 a method to display the telephone numbers in the order of the number of placing calls. In this case, the number of placing calls is stored together with the telephone number and increased by one every time the number is called. The retrieval is made with reference to the number of placing calls recorded in the telephone number data. According to this method, more frequently used number are retrieved sooner, so that the time required for the retrieval and the number of operations by the user are reduced on the average, whereby the efficiency in placing a call improves as a whole.

The retrieval of telephone numbers in the callers area is normally made based on a reception time. Specifically, a telephone number of the earliest call is retrieved first, and thereafter, telephone numbers are retrieved in the order of reception time.

Telephone apparatuses are on the market which are provided with both the directory function and the callers function. The telephone number data stored in the directory area and the telephone number data stored in the callers area are separately controlled. For this reason, the calling by use of the callers function has no effect on the telephone number data in the directory area. This is a serious problem when the retrieval from the directory area is made based on the number of placing calls. That is, since the number of placing calls of the telephone number data in the directory area is not renewed when a call is placed according to the callers function, the retrieval is not made in the correct order in the retrieval from the directory area. Then, this function is meaningless.

In the telephone apparatus where the access from the sub unit to the base unit is inhibited when the base unit is busy, the telephone numbers in the callers area cannot be referred to and the data in the directory area cannot be modified when the base unit is busy. There is a private telephone system including a main apparatus connected to the public telephone line and a plurality of terminal telephone apparatuses connected to the main apparatus, where information stored in the main apparatus can be referred to from the terminal apparatuses. In such a private telephone system, the terminal telephone apparatuses may be cordless telephone apparatuses each comprising a base unit and a sub unit. However, if the access from the sub unit is inhibited when the base unit is busy, it is impossible to access the main apparatus from the sub unit, so that the information stored in the recording medium of the main apparatus cannot be referred to.

Some sub units are designed so that the receiver's telephone number to be called is displayed by the display when a call is placed. This enables the user to confirm the telephone number before calling. The telephone number is displayed when a call is placed with the base unit as well as with the sub unit. In a cordless telephone apparatus having a base unit provided with no display, when a call is placed with the base unit, the telephone number to be called is confirmed through the display on the sub unit, if the sub unit is placed nearby.

However, the base unit is frequently used when the sub unit is away from the base unit. In such a case, it is a useless irradiation of the electric wave and a waste of electric power to cause the sub unit to display the telephone number which cannot be seen by the user. Further, it is a problem in the protection of privacy that the display of the telephone number to be called is displayed on the sub unit.

Thus, in conventional cordless telephone apparatuses have various problems in the control of the telephone data and in the efficiency in the data transfer between the base and sub units.

SUMMARY OF THE INVENTION

An object of the present invention is to improve the efficiency in data transfer between the base and sub units and to improve a method to control telephone number data in a cordless telephone apparatus.

Another object of the present invention is to improve the efficiency in data transfer and data control while more securely protecting the privacy of the user of the apparatus.

To achieve the above-mentioned objects, according to the present invention, in a cordless telephone apparatus where a call can be made with both the sub and base units and the telephone number data are stored in the base unit, the access from the sub unit to the telephone number data stored in the base unit is permitted whether the base unit is busy or not. When the base unit is busy, it is inhibited to monitor the call from the sub unit. With these features, the telephone number data stored in the base unit can be accessed from the sub unit at any time, and the privacy of the user of the base unit is protected.

The base units has two telephone number data storing areas: a directory area and a callers area. The data in the directory area are retrieved based on corresponding numbers of placing calls, and the data in the callers area are retrieved based on corresponding reception times. When a call is placed by use of a telephone number stored in the callers area, the number of placing calls included in the telephone number data in the directory area is renewed. By this setting, the data in the directory area always includes correct numbers of placing calls, so that the data retrieval based on the numbers of placing calls always functions correctly.

The sub unit apparatus has a display capable of displaying one telephone number data to display the telephone number data retrieved from the directory or callers area. The sub unit also has keys for controlling the directory function and the callers function in addition to dial keys for inputting a telephone number. The user of the sub unit instructs the data retrieval with these keys so that the telephone number data are displayed by the display one by one if necessary. The telephone number data in the directory area retrieved in the above-described manner are displayed in the descending order of the number of placing calls, so that it is more likely that the necessary telephone number is displayed sooner. As a result, the time required for calling and the number of key operations are reduced.

A receiver's telephone number to be called is displayed by the display when a call is placed with the sub or the base unit. The receiver's telephone number is always displayed when a call is placed with the sub unit. When a call is placed with the base unit apparatus, the display of the receiver's telephone number is provided only when the sub unit is placed on the base unit or just after it is lifted from the base unit. When a call is placed with the base unit with the sub unit being away from the base unit, the telephone number is not transmitted to the sub unit by wireless. For this reason, the useless irradiation of the electric wave and the waste of electric power are prevented. In addition, since the telephone number dialed at the base unit is not displayed by the display of the sub unit, the privacy of the user of the base unit is protected.

The cordless telephone apparatus having the above-described features can be employed as a terminal apparatus in a private telephone system where a plurality of terminal apparatuses are connected to a main apparatus. In this case, the data stored in the storing area provided in the main apparatus can be referred to from the terminal apparatuses. The access from the sub unit to the main apparatus is possible even when the base unit of the terminal apparatus is busy, so that the access from the sub unit to the data is made at any time. Further, the callers area and the directory area may be provided in the main apparatus. In that case, an identification code is provided to each terminal telephone apparatus, and the telephone number data stored in the main apparatus are protected and controlled based on the identification code. The access to the data from the terminal apparatus is permitted only when the identification codes coincide with each other. In the private telephone system having such features, the telephone number data can be controlled collectively, and the access from outsiders to the telephone number data is limited so that the secrecy is protected. In addition, the access from the sub unit to the telephone number data is possible even when the base unit is busy, so that the efficiency in data transfer between the sub unit and the main apparatus improves.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
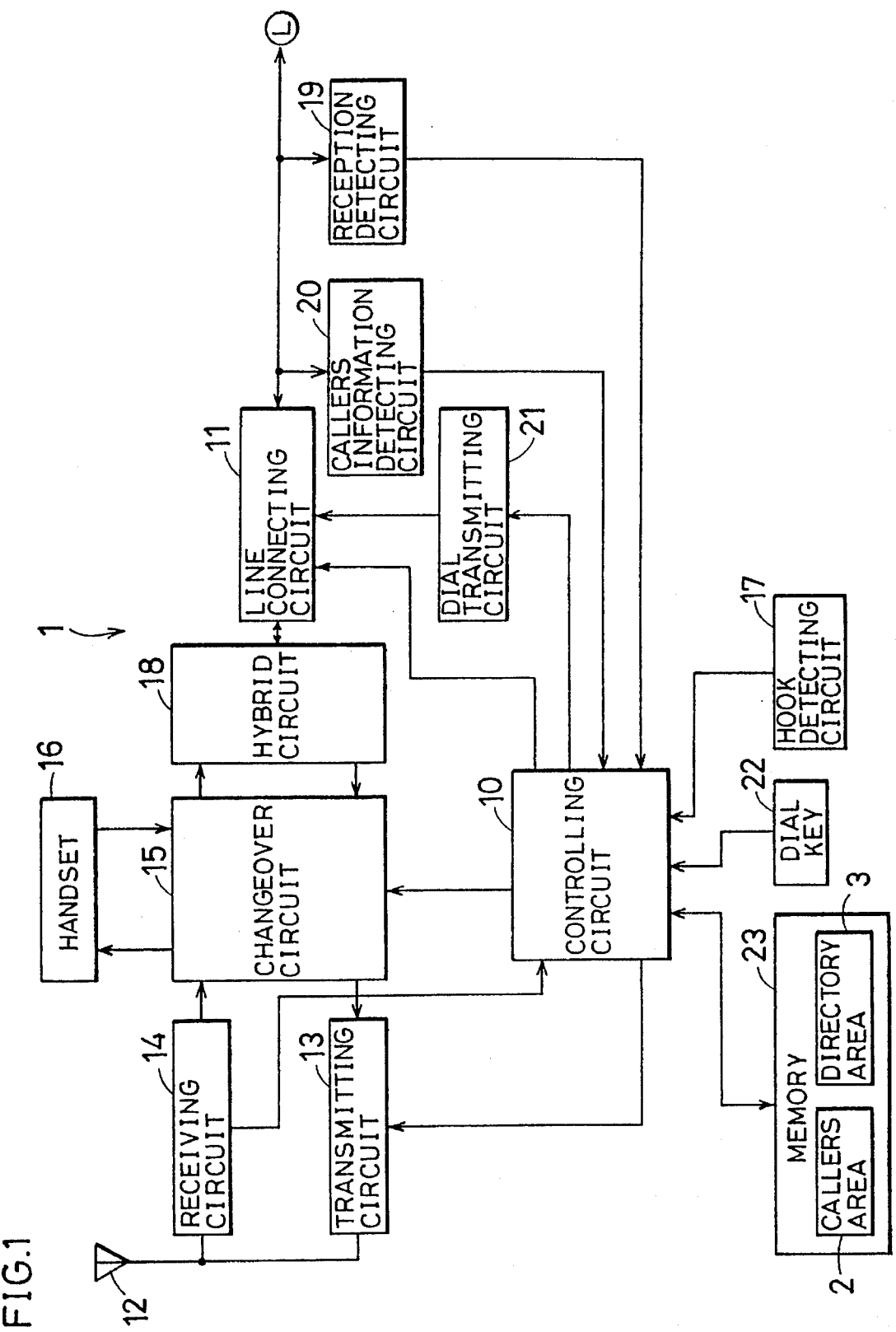
FIG. 1 is a block diagram showing the arrangement of a base unit of a cordless telephone apparatus according to a first embodiment of the present invention.
Figure 2:
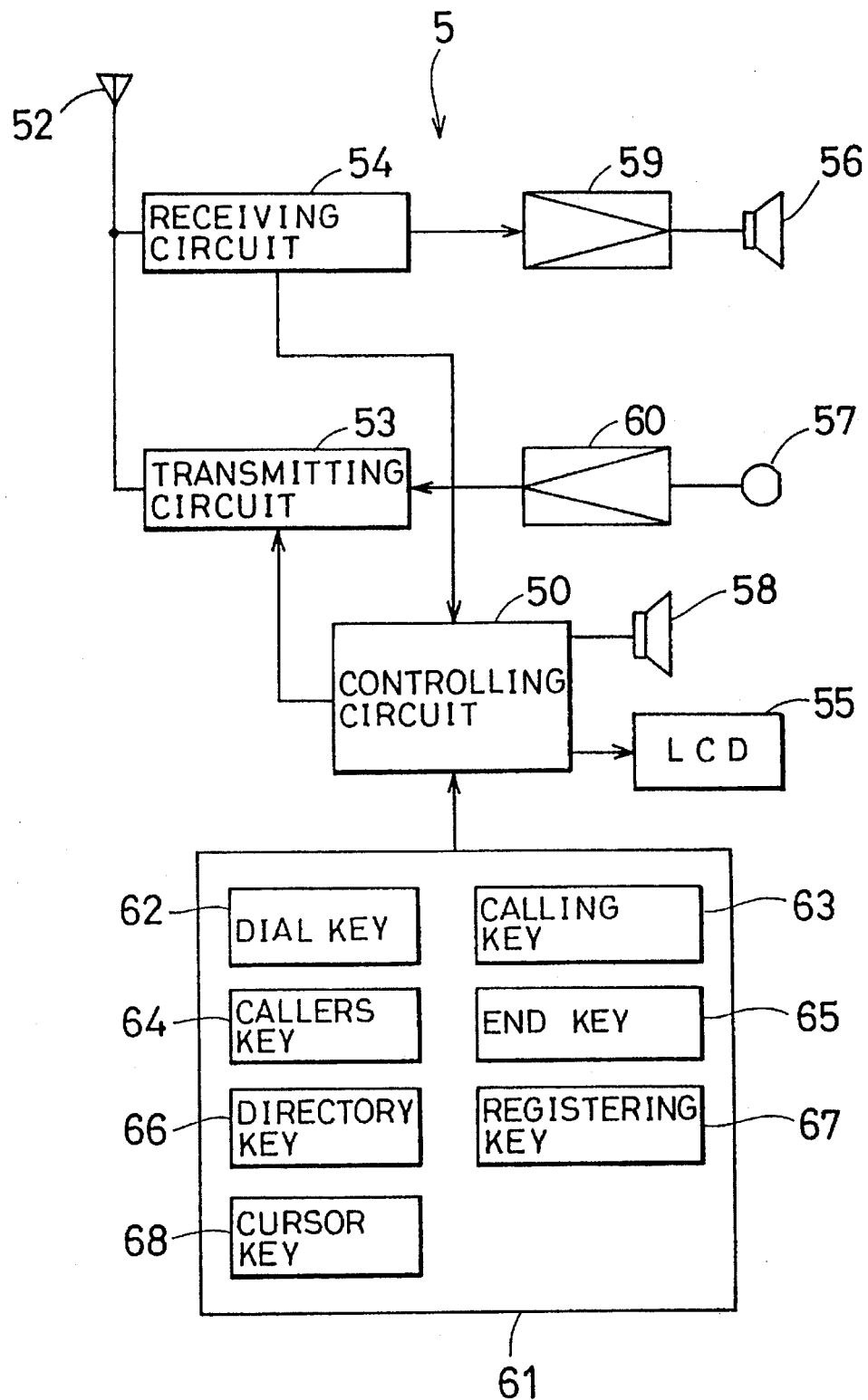
FIG. 2 is a block diagram showing the arrangement of a sub unit according to the first embodiment of the present invention.

FIGS. 1 and 2 are block diagrams respectively showing the arrangements of a base unit 1 and a sub unit 5 of a cordless telephone apparatus according to a first embodiment of the present invention. The base unit 1 is provided with a line connecting circuit 11, and connected to and disconnected from a telephone line L by the closing and opening of the line connecting circuit 11. The base unit 1 is also provided with an antenna 12 for wireless signal transfer with the sub unit 5. To the antenna 12, a transmitting circuit 13 for transmission to the sub unit 5 and a receiving circuit 14 for reception from the sub unit 5 are connected. The transmitting circuit 13 and the receiving circuit 14 are connected to a changeover circuit 15. The base unit 1 is provided with a handset 16 for making and receiving calls. The handset 16 is connected to the changeover circuit 15. The attachment and detachment of the handset 16 to and from the body of the base unit 1 are detected by a hook detecting circuit 17.

The changeover circuit 15 is provided to make a changeover between calling with the base unit 1 by use of the handset 16 and calling with the sub unit 5 through the transmitting and receiving circuits 13 and 14. The changeover circuit 15 is connected to the line connecting circuit 11 through a hybrid circuit 18. The telephone line L consists of two lines, and the line between the changeover circuit 15 and the handset 16 and the line between the changeover circuit and the transmitting and receiving circuits 13 and 14 each consist of four lines, so that the hybrid circuit 18 makes a 2 line to 4 line conversion.

A reception detecting circuit 19 for detecting the reception and a caller information detecting circuit 20 for detecting the telephone number data of a caller transmitted from the switching station are provided to be connected directly to the telephone line L. To the line connecting circuit 11, a dial transmitting circuit 21 for transmitting a dial signal is connected. Further, dial keys 22 are provided for inputting numbers.

The base unit apparatus 1 is provided with a controlling circuit 10 including a microcomputer to control the circuits. The controlling circuit 10 controls the line connecting circuit 11 to make the connection and disconnection to and from the telephone line L, and controls the changeover circuit 15 to make a changeover between a connection between the hybrid circuit 18 and the handset 16 and a connection between the hybrid circuit 18 and the transmitting and receiving circuits 13 and 14. Further, when a call is placed, the controlling circuit 10 controls the dial transmitting circuit 21 to generate a dial signal. The controlling circuit 10 is also connected to the transmitting circuit 13, the receiving circuit 14, the hook detecting circuit 17, the reception detecting circuit 19, the caller information detecting circuit 20 and the dial keys 22.

The base unit 1 has a rewritable memory 23 including a directory area 3 for storing frequently called telephone numbers and a callers area 2 for storing callers' telephone numbers. The memory 23 is controlled by the controlling circuit 10. Table 1 shows examples of the telephone number data stored in the callers area 2 and the directory area 3. The telephone number data of a caller detected by the caller information detecting circuit 20 is stored in the callers area 2 together with the reception time which is transmitted from the switching station with the telephone number. In the directory area 3, the number of placing calls of a telephone number is stored together with the telephone number. The storage of the telephone number data in the directory area 3 is performed by using the sub unit 5.

Referring to FIG. 2, the sub unit 5 has an antenna 52 for signal transfer with the base unit 1. To the antenna 52, a receiving circuit 54 for signal reception from the base unit and a transmitting circuit 53 for transmission to the base unit 1 are connected. To the receiving circuit 54, a speaker 56 is connected through an amplifier 59. To the transmitting circuit 53, a microphone 57 is connected through an amplifier 60. Further, a liquid crystal display (LCD) 55 for displaying the telephone number data, a bell 58 for generating a call sound when a call is received, and a controlling circuit 50 including a microprocessor are provided. The transmitting circuit 53, the receiving circuit 54, the LCD 55 and the bell 58 are connected to the controlling circuit 50.

A key circuit 61 for the user to perform various operations is provided to be connected to the controlling circuit 50. The key circuit 61 is provided with dial keys 62 for inputting numbers, a calling key 63 for generating a calling request, a callers key 64 for generating a request of access to the callers area 2 of the base unit 1, an end key 65 for generating an operation end signal, a directory key 66 for generating a request of access to the directory area 3 of the base unit 1, a registering key 67 for generating a request to register a telephone number in the directory area 3, and a cursor key 68 for generating a request of the next retrieval of data stored in the callers or directory area.

The cordless telephone apparatus of this embodiment including the base unit 1 and the sub unit 51 and having the above-described arrangement operates in a subsequently described manner.

When a call is received, first, the reception detecting circuit 19 of the base unit 1 detects the reception and the caller information detecting circuit 20 detects the telephone number data of the caller. The detected telephone number of the caller is transmitted to the memory 23 by the controlling circuit 10 and stored in the callers area 2. In response to the detection of the reception by the reception detecting circuit 19, the controlling circuit 10 instructs the transmitting circuit 13 to generate a reception signal, so that a reception signal is generated by the transmitting circuit 30. The controlling circuit 10 also instructs the transmitting circuit 13 to transmit the telephone number data of the caller to the sub unit 5. The receiving circuit 54 of the sub unit 5 receives the reception signal and the telephone number data from the base unit 1 and transmits it to the controlling circuit 50. The controlling circuit 50 rings the bell 58 to notify the user that a call has been received. The telephone number data of the caller is displayed on the LCD 55. In response thereto, the user presses the calling key 63 of the sub unit 5 or takes up the handset 16.

When the calling key 63 is pressed, the controlling circuit 50 of the sub unit 5 causes the transmitting circuit 53 to transmit a response signal. Receiving the response signal through the receiving circuit 14, the controlling circuit 10 of the base unit 1 controls the changeover circuit 15 to connect the transmitting and receiving circuits 13 and 14 to the hybrid circuit 18 and controls the line connecting circuit 11 to make a connection to the telephone line L. Thereby, the sub unit 5 is connected to the base unit 1 by wireless and further to the telephone line L, so that the calling with the sub unit 5 is enabled. The user makes a call by use of the microphone 57 and the speaker 56 of the sub unit 5.

When the handset 16 is taken up, the hook detecting circuit 17 detects that the handset 16 has been unhooked, and the controlling circuit 10 controls the changeover circuit 15 to connect the handset 16 to the hybrid circuit 18, and causes the line connecting circuit 11 to make a connection to the telephone line L. Thereby, the calling with the base unit 1 is enabled, and the user makes a call by use of the handset 16. The controlling circuit 10 causes the transmitting circuit 13 to transmit a signal indicating that the base unit is busy, to stop the bell 58 and display of the telephone number data of the caller on LCD 55.

The caller information detecting circuit 20 is connected to the telephone line L not through the line connecting circuit 11 but directly, so that the caller's telephone number data is detected even though the connection to the telephone line L is not made. That is, even when there is a call in the user's absence, the telephone number of the caller is detected and stored in the callers area 2.

In placing a call, the operations to be performed by the user and the apparatus differ between the case where a data in the callers or directory area is used and the case where the telephone number is directly inputted. First, the case where the telephone number is directly inputted will be described.

To place a call with the sub unit 5, the user presses the calling key 63 of the key circuit 61 of the sub unit 5 and inputs a telephone number by use of the dial keys 62. At this time, the inputted telephone number is displayed by the LCD 55 so that the user may confirm it. After the telephone number is inputted, the controlling circuit 50 causes the transmitting circuit 53 to transmit the telephone number. The base unit 1 receives the number through the receiving circuit 14, so that the controlling circuit 10 controls the changeover circuit 15 to connect the transmitting and receiving circuits 13 and 14 to the hybrid circuit 18. The controlling circuit 10 also controls the line connecting circuit 11 to make a connection to the telephone line L, so that the received telephone number is transmitted by the dial transmitting circuit To place a call with the base unit 1, the user takes up the handset 16 and inputs a telephone number by use of the dial keys 22. The hook detecting circuit 17 detects that the handset 16 is unhooked, so that the controlling circuit 10 controls the changeover circuit 15 to connect the handset 16 to the hybrid circuit 18 and controls the line connecting circuit 11 to make a connection to the telephone line L. Further, the control circuit 10 causes the dial transmitting circuit 21 to transmit the telephone number inputted by use of the dial keys 22. In addition, the controlling circuit 10 causes the transmitting circuit 13 to transmit the inputted number to the sub unit 5, where the received number is displayed by the LCD 55. When the sub unit 5 is near the base unit 1, the user can confirm the inputted number through the display of the sub unit 5.

The call according to the callers or directory function using the telephone number data in the callers or directory area 2 or 3 is placed with the sub unit 5. The user operates the callers key 64 or the directory key 66 to retrieve a necessary telephone number data from the memory 23 of the base unit 1. The operation of access to the memory 23 and corresponding processings performed by the sub and base units 5 and 1 will be described later in detail. The retrieved telephone number data is displayed by the LCD 55 of the sub unit 5. After confirming that the number is the necessary number, the user operates the calling key 63 to request a call. Thereafter, the sub and base units 5 and 1 operate in a manner similar to that of the case where the telephone number is directly inputted at the sub unit 5, so that the sub unit 5 is connected to the telephone line L to enable the calling with the sub unit 5. When the connection to the telephone line L is made, the controlling circuit 10 of the base unit 1 renews a part of the data in the memory 23 as described later.

Figure 3:
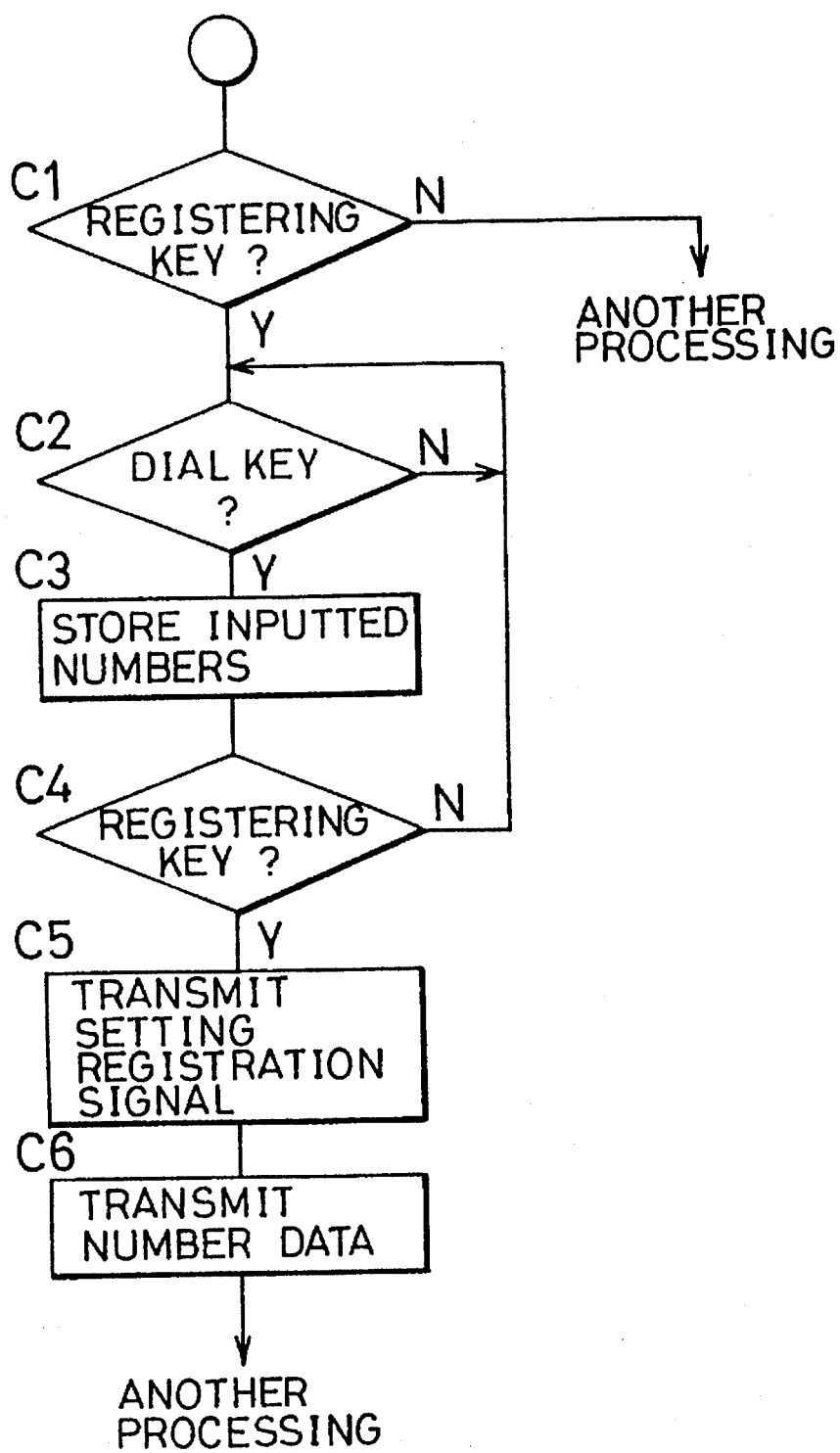
FIG. 3 is a flowchart of a processing performed by the sub unit to register a telephone number in a directory area in the first embodiment of the present invention.
Figure 4:
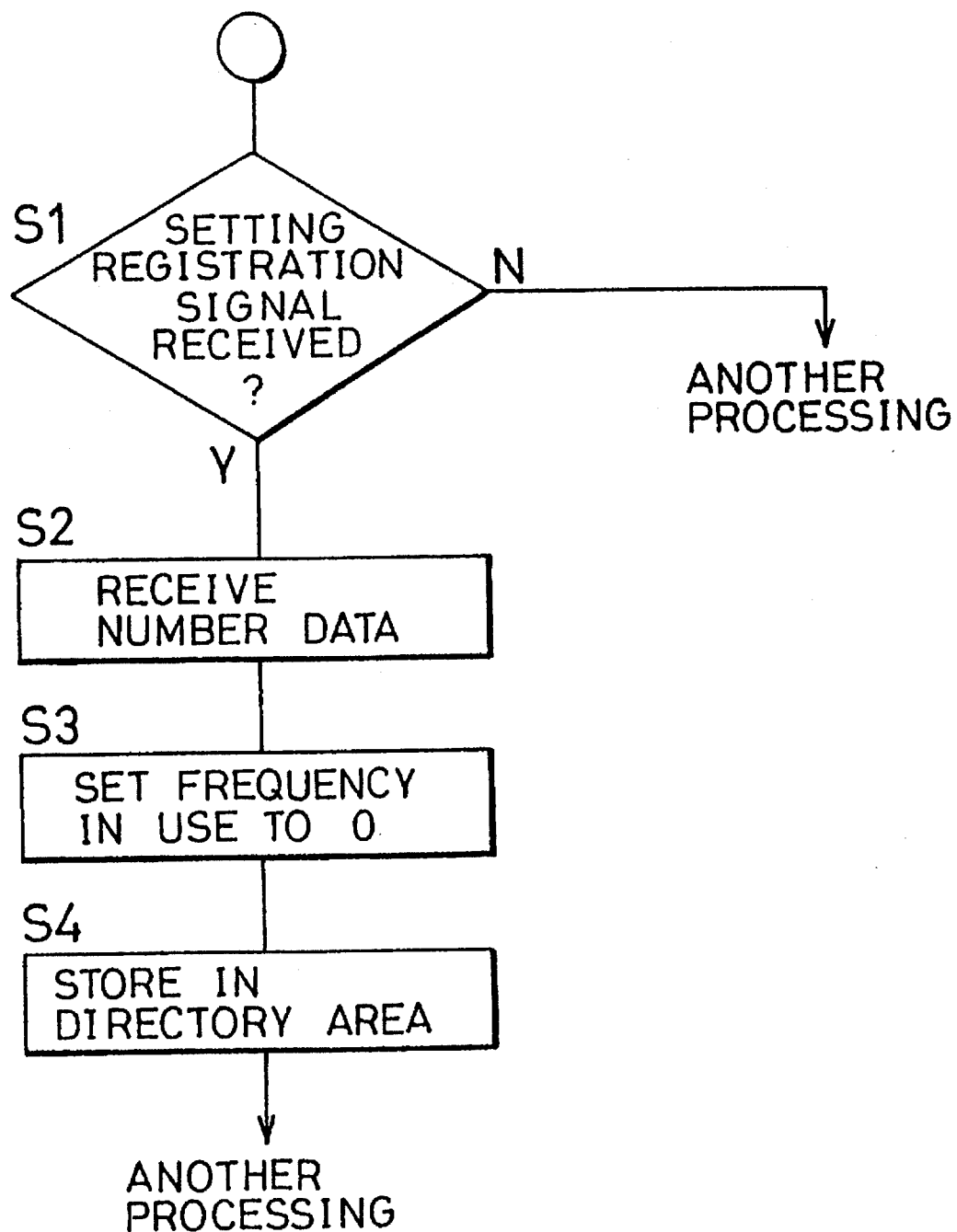
FIG. 4 is a flowchart of a processing performed by the base unit to register a telephone number in the directory area in the first embodiment of the present invention.

The registration of a new telephone number data in the directory area 3 in the cordless telephone apparatus of this embodiment will be described. The processings performed by the sub and base units 5 and 1 in the registration in the directory area are shown by the flowcharts of FIGS. 3 and 4, respectively. When the registering key 67 of the key circuit 61 of the sub unit 5 is operated, the controlling circuit 50 of the sub unit 5 detects it at step C1 of FIG. 3. Then, the controlling circuit 50 monitors the input of numbers by use of the dial keys 62 at step C2, and temporarily stores the inputted numbers in an internal register at step C3. When it is detected at step C4 that the registering key 67 is operated again, a setting registration signal is transmitted to the base unit 1 at step C5, and the number data stored in the internal register are transmitted at step C6 in the order of storage.

Detecting the reception of the setting registration signal at step S1 of FIG. 4, the base unit 1 enters a mode of registration in the directory area 3. The base unit 1 receives the number data at step S2, sets the number of placing calls to 0 at step S3, and stores the number of placing calls together with the number data in the directory area 3 at step S4. Thereby, the registration of the telephone number data in the directory area 3 is completed. Then, the base unit 1 goes out of the registration mode.

Although not shown, when the entire of the directory area 3 is used, a processing to delete unnecessary data is performed prior to the data registration.

Figure 5:
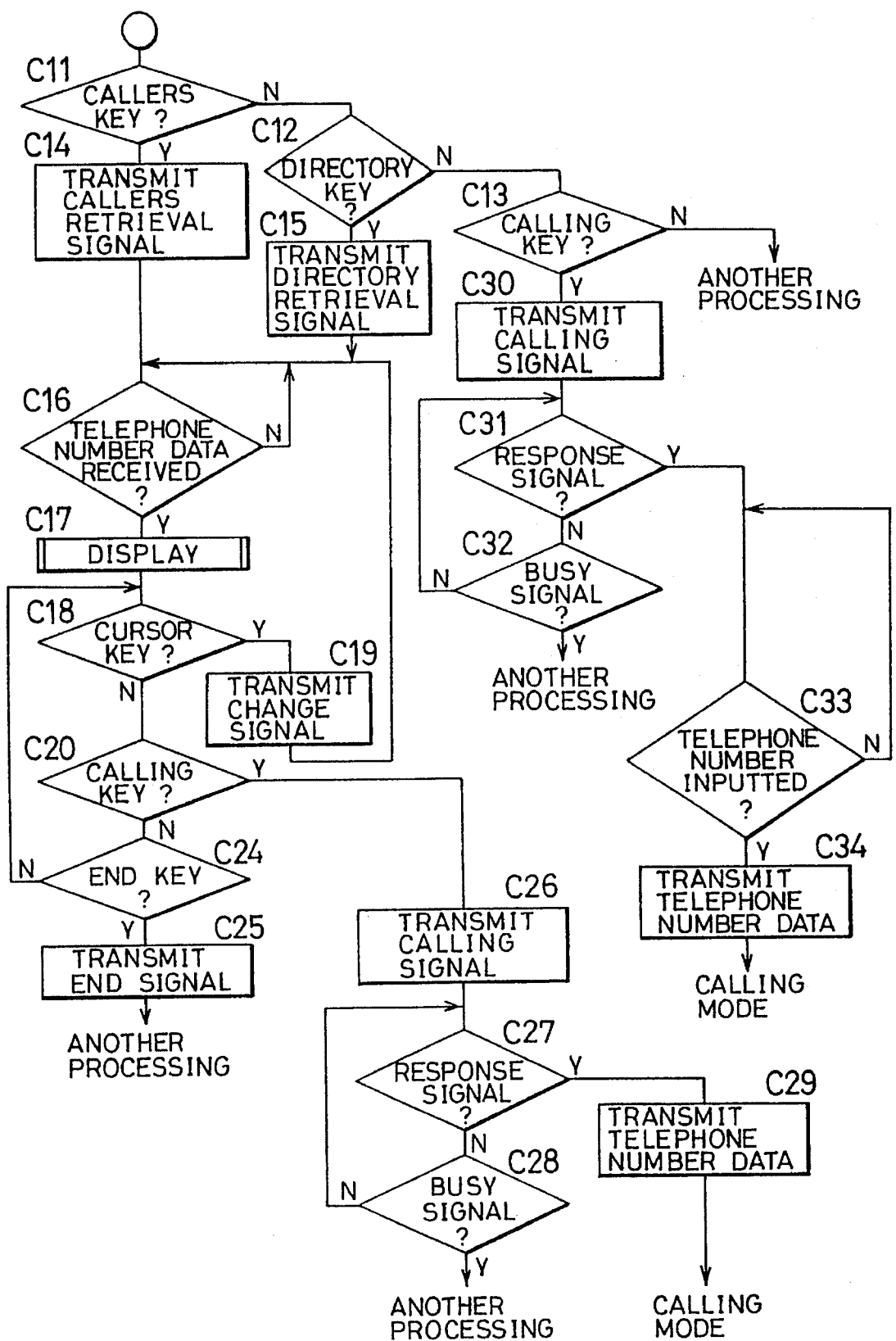
FIG. 5 is a flowchart of a processing performed by the sub unit when a call is placed with the sub unit in the first embodiment of the present invention.
Figure 6:
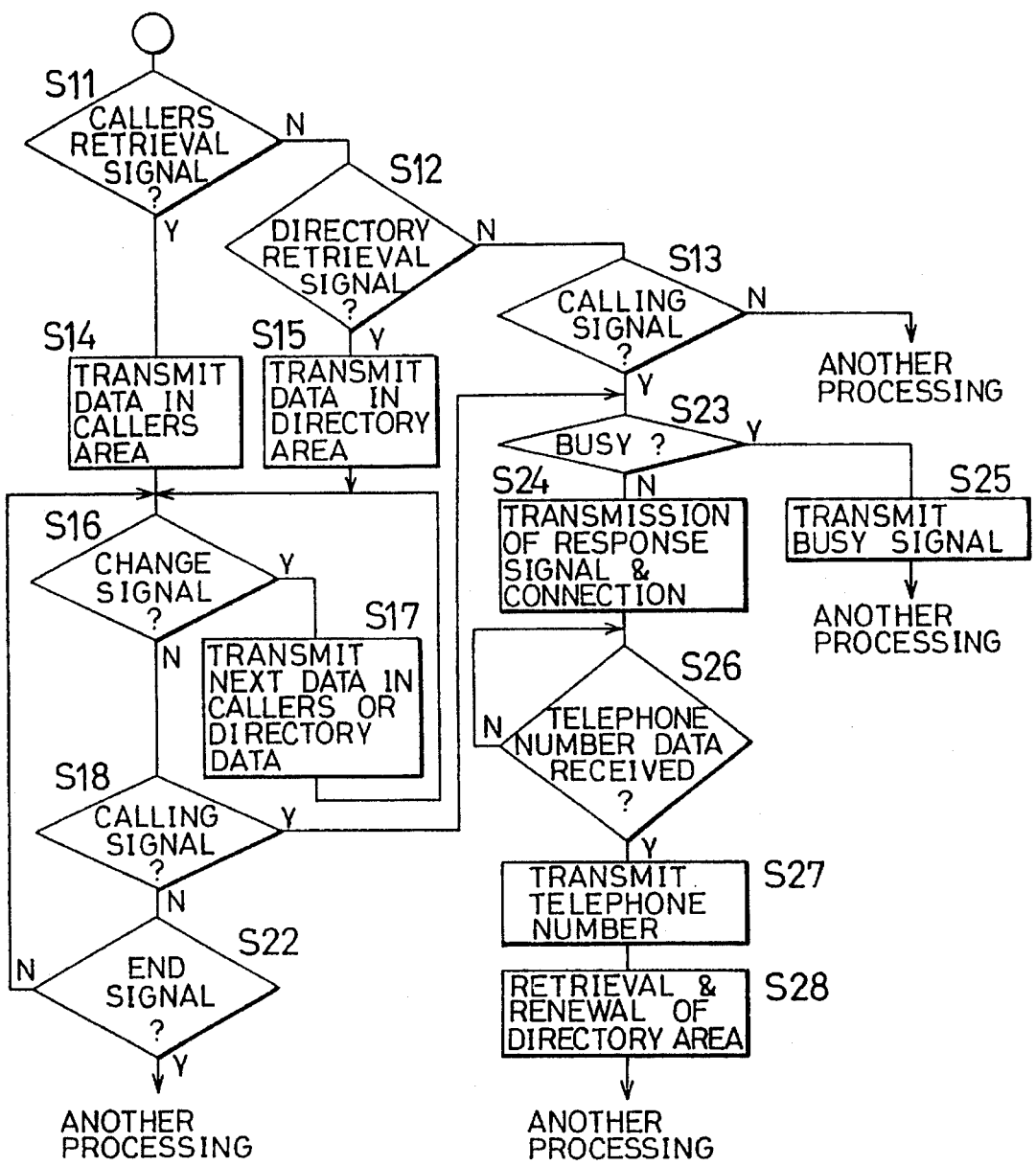
FIG. 6 is a flowchart of a processing performed by the base unit when a call is placed with the sub unit in the first embodiment of the present invention.

FIGS. 5 and 6 are flowcharts of control processings performed by the sub and base units 5 and 1 when a call is placed. The user operates the callers key 64 or the directory key 66 or the calling key 63 of the key circuit 61 of the sub unit 5 to start a calling operation. In the sub unit 5, the key input is detected at step C11 or C12 or C13 of FIG. 5 to perform a corresponding calling operation. In the base unit 1, a signal from the sub unit 5 is received at step S11 or S12 or S13 of FIG. 6 to perform the corresponding calling operation.

First, a processing will be described which is performed when a call is placed by using a telephone number stored in the callers area 2. The controlling circuit 50 of the sub unit 5 detects an operation of the callers key 64 at step C11, and transmits a callers retrieval signal to the base unit 1 at step C14. In the callers area 2, a plurality of data each consisting of the telephone number of a caller and the reception time of the call are stored. The data retrieval from the callers area 2 is made based on the reception time. The controlling circuit 10 of the base unit 1 receives the callers retrieval signal from the sub unit 5 at step S11, and retrieves the telephone number data of the earliest call from the callers area 2 and transmits it to the sub unit 5. The controlling circuit 50 of the sub unit 5 detects the reception of the telephone number data at step C16, and causes the LCD 55 to display the telephone number and the reception time at step C17.

When the displayed telephone number is not the necessary one, the user operates the cursor key 68. The sub unit 5 detects it at step C18 and transmits a change signal to the base unit 1 at step C19. The base unit 1 detects the change signal at step S16, and retrieves the telephone number data of the second earliest call and transmits it at step S17. In the sub unit 5, the process returns to step C16 and the newly transmitted telephone number data is displayed at step C17. Thus, the user operates the cursor key 68 until the necessary telephone number is displayed. When the cursor key 68 is further operated after all the data in the callers area are transmitted to the sub unit 5, the base unit 1 retrieves the earliest data and performs the data transmission of step S17.

When the necessary telephone number is displayed by the LCD 55, the user operates the calling key 63. The sub unit 5 detects it at step C20, transmits a calling signal to the base unit 1 at step C26 and waits until a signal from the base unit 1 is detected at either step C27 or step C28. The base unit 1 detects the calling signal at step S18, and detects the hooking condition of the handset 16 by the hook detecting circuit 17 to determine whether the base unit 1 is busy or not at step S23. When the handset 16 is hooked, at step S24, a response signal is transmitted to the sub unit 5, and the changeover circuit 15 is controlled to connect the transmitting and receiving circuits 13 and 14 to the hybrid circuit 18 and the line connecting circuit 11 is caused to make a connection to the telephone line L. When the handset 16 is unhooked, it is determined that the base unit 1 is busy, so that a busy signal is transmitted at step S25. The sub unit 5 detects the busy signal at step C28, and stops the calling according to the callers function to move to another processing. When the response signal is detected at step C27, the sub unit 5 transmits the telephone number displayed by the LCD 55 to the base unit 1 at step C29 and enters a calling mode.

The base unit 1 receives the telephone number from the sub unit 5 at step S26 and causes the dial transmitting circuit to transmit the number at step S27. Then, the process proceeds to step S28 to detect whether the transmitted telephone number is stored in the directory area 3 or not. When the transmitted telephone number is present in the directory area 3, the number of placing calls of the number is increased by one to renew the telephone number data in the directory area The processing of step C18 and succeeding steps of the sub unit 5 is stopped by pressing the end key 65. When it is detected at step C24 that the end key has been operated, an end signal is transmitted to the base unit 1 at step C25, and the sub unit 5 moves to another processing. When the end signal is received at step S22, the base unit 1 stops the retrieval from the callers area 2 and moves to another processing.

The calling according to the callers function is made by the above-described processing. In this embodiment, in the calling according to the callers function, the data in the callers area 2 is not renewed but is only referred to. On the contrary, the data in the directory area 3 is renewed, so that correct numbers of placing calls are always stored.

The telephone number data in the callers area 2 is renewed every time a call is received. At this time, when the call is from a telephone number having already been stored in the callers area 2, the reception time of the telephone number is renewed. When the call is from a telephone number not stored in the callers area 2, the telephone number and the reception time are stored. When the entire of the callers area 2 is used, the oldest data is deleted prior to the addition of the new telephone number data.

When a call is placed by using the telephone number data stored in the directory area 3, the following processing is performed. The sub unit 5 detects at step C12 of FIG. 5 that the directory key 66 has been operated, and transmits a directory retrieval signal to the base unit 1 at step C15. In the directory area 3, a plurality of data each consisting of a telephone number and the number of placing calls of the telephone number are stored. The data retrieval from the directory area 3 is made based on the number of placing calls. The base unit 1 detects the directory retrieval signal at step S12 of FIG. 6, and selects the most frequently used telephone number and transmits it to the sub unit 5 at step S15.

The operations performed by the user are the same as those of the calling according to the callers function. The processing performed in the sub unit 5 is different only in that the number of placing calls is displayed together with the telephone number at step C17. The processing performed in the base unit 1 is the same as that of the calling according to the callers function except that the data in the directory area 3 are transmitted in the order of the number of placing calls at step S17. In the calling according to the directory function, the number of placing calls is increased by one at step S28 of FIG. 6 so that the data in the directory area 3 is renewed. Thereby, the data retrieval based on the number of placing calls always functions correctly.

When the callers key 64 and the directory key 66 are not operated and the calling key 67 is operated, the previously-described calling with the sub unit 5 by inputting a telephone number is performed. When an operation of the calling key 67 is detected at step S13 of FIG. 5, the sub unit 5 transmits a calling signal to the base unit 1 at step C30. The base unit 1 detects the reception of the calling signal at step S13 of FIG. 6, and performs a previously-described processing of step S23 and succeeding steps. The sub unit 5 detects a response signal from the base unit 1 at step C31, and receives the telephone number inputted by means of the dial keys at step C33. When the telephone number is inputted to predetermined figures, the inputted telephone number is transmitted to the base unit 1 at step C34.

In this case, whether the transmitted telephone number is present in the directory area 3 or not is also detected at step S28 of FIG. 6. When it is present, the number of placing calls of the telephone number is increased by one. Thus, in making a call by inputting the telephone number, the number of placing calls is renewed, which is reflected in the data retrieval based on the number of placing calls. Moreover, although not shown, this processing is also performed when a call is made with the base unit 1. When the transmitted telephone number is not present in the directory area 3, the automatic addition of data is not made.

As described above, in the cordless telephone apparatus of this embodiment, the base unit 1 accepts the callers retrieval signal and the directory retrieval signal irrespective of the setting of the changeover circuit 15, and retrieves the telephone number data stored in the memory 23. Therefore, it is possible to access from the sub unit 5 to the telephone number data in the callers area 2 and in the directory area 3 of the base unit 1 even when the base unit 1 is busy, and the data transfer between the base and sub units 1 and 5 can be performed at any time. Since the number of placing calls of the telephone number data in the directory area 3 is automatically renewed, the data retrieval based on the number of placing calls always functions correctly. When the base unit 1 is busy, the handset 16 is connected to the hybrid circuit 18 and the transmitting and receiving circuits 13 and 14 are not connected to the hybrid circuit 18, so that the call cannot be monitored through the sub unit 5. Thus, the privacy of the user of the base unit 1 is protected. Further, since the telephone number is not stored when a call is placed by inputting the telephone number by means of the dial keys, it is prevented that unnecessary telephone numbers are registered, so that the privacy is protected.

A cordless telephone apparatus according to a second embodiment of the present invention will be described. This embodiment is different from the first embodiment in the method of controlling the data in the callers area 2 and in the directory area 3 of the memory 23. The contents of storage of the memory 23 of the base unit 1 in this embodiment are shown in Tables 2 and 3. The telephone number data in the callers area 2 includes the number of placing calls in addition to the data of the first embodiment shown in Table 1. In other respects, the arrangement of this embodiment is the same as that of the first embodiment shown in FIGS. 1 and 2. Only the difference will be described.

In the first embodiment, in any of the calling according to the callers function, the calling according to the directory function and the calling by inputting a telephone number by means of the dial keys, when the transmitted telephone number is present in the directory area 3, the number of placing calls of the telephone number is automatically renewed by being increased by one. In this embodiment, however, the automatic data renewal in the directory area 3 is not made in the calling according to the callers function. Instead, when the user operates a key, the data in the directory area 3 is renewed based on the data in the callers area 2.

In this case, the number of placing calls stored in the callers area 2 is the number of calls placed by using the callers function. The retrieval of the telephone number data from the callers area 2 is made based on the reception time similarly to the first embodiment. The LCD 55 of the sub unit 5 displays the number of placing calls stored in the callers area 2 together with the telephone number and the reception time.

Figure 7:
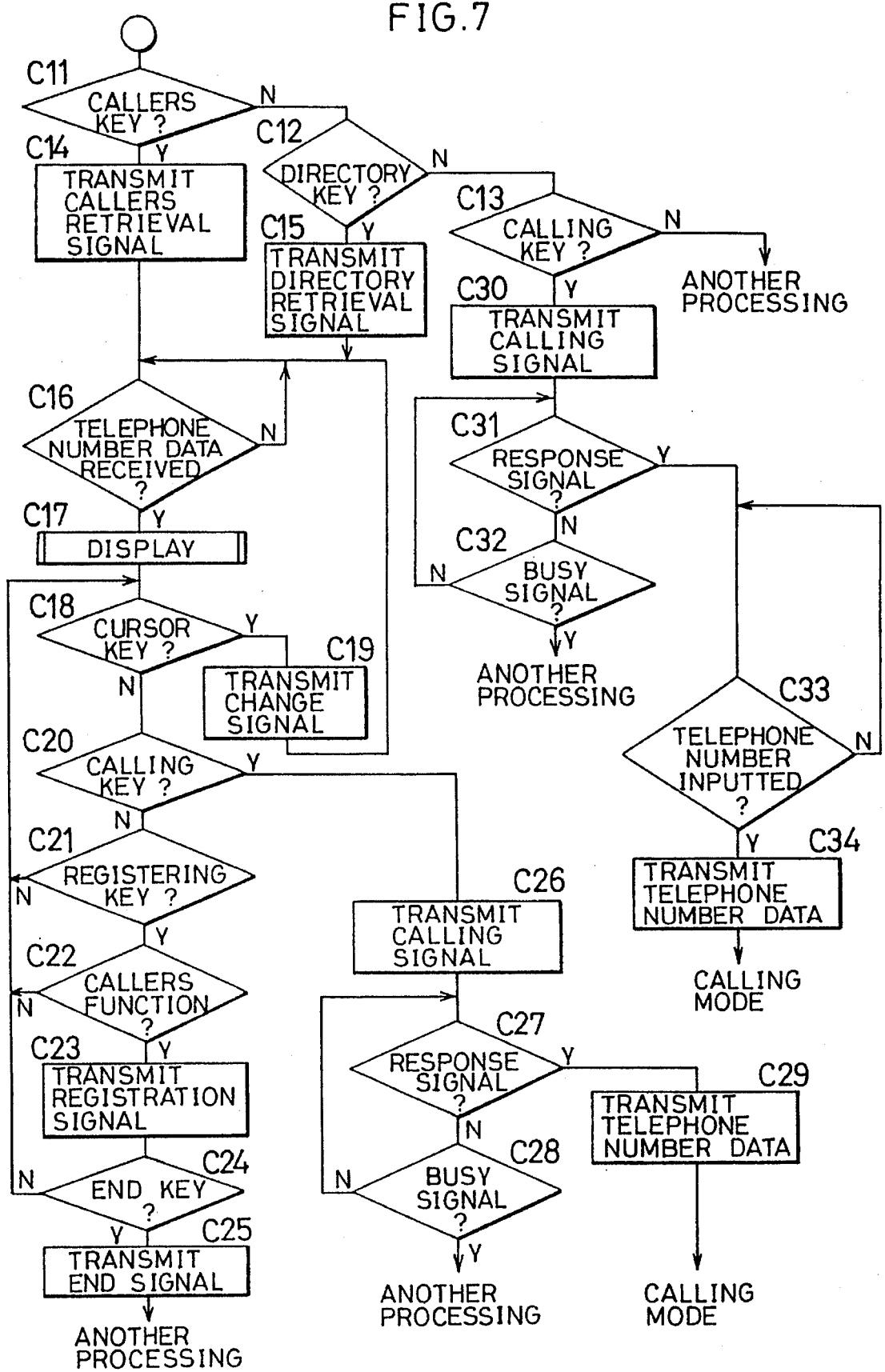
FIG. 7 is a flowchart of a processing performed by the sub unit when a call is placed with the sub unit in a second embodiment of the present invention.
Figure 8:
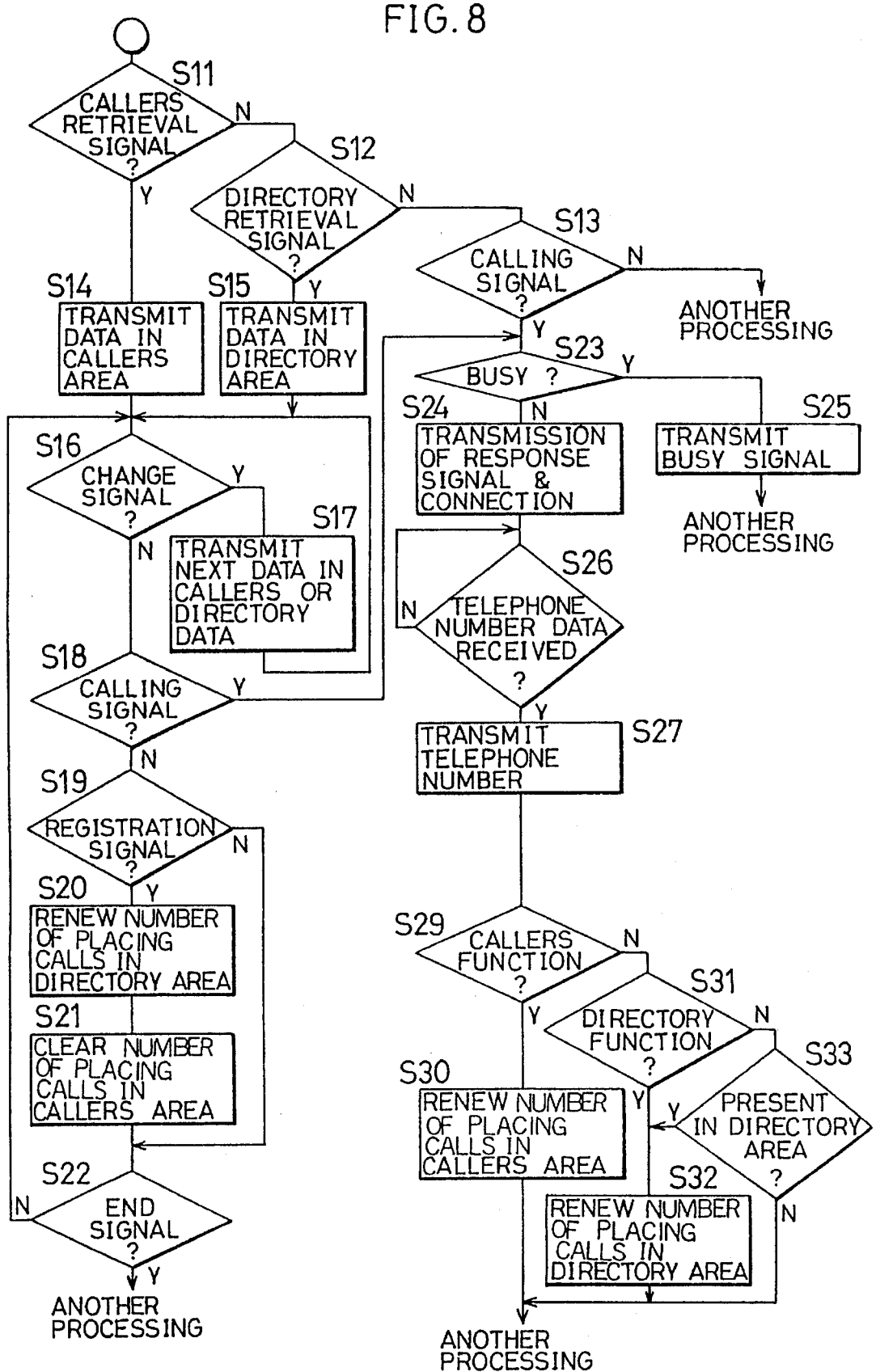
FIG. 8 is a flowchart of a processing performed by the base unit when a call is placed with the sub unit in the second embodiment of the present invention.

The processing performed by the sub unit 5 when a call is placed in this embodiment will be described with reference to the flowchart of FIG. 7. This flow is different from that of FIG. 5 only in that steps C21, C22 and C23 are inserted between steps C20 and C24. The processing performed by the base unit 1 corresponding to the processing of the sub unit 5 of FIG. 7 is shown in FIG. 8. This flow is the same as that of FIG. 6 except that steps S19, S20 and S21 are inserted between steps S18 and S22 and that the step S28 is replaced by steps S29 to S33.

As shown in FIG. 7, the processing performed by the sub unit 5 in the calling according to the callers function or the directory function started by operating the caller key 64 or the directory key 66 is performed in the same manner as that of the first embodiment to step C20. The processing by the base unit 1 is performed in the, similar manner to step S18. However, as described above, according to the callers function, the number of placing calls is transmitted from the base unit 1 to the sub unit 5 together with the telephone number and the reception time. These data are displayed at step C17.

In the sub unit 5, when the registering key 67 is operated while steps C16 to C24 is repeated, the operation of the key 67 is detected at step C21. At this time, when it is determined at step C22 that the processing is started by the operation of the callers key 64 performed at step C11, a registration signal is transmitted to the base unit 1 at step C23. The base unit 1 detects the registration signal at step S19, and adds the numbers of placing calls of all the telephone numbers in the callers area 2 to the corresponding numbers of placing calls of the telephone number data in the directory area 3 to renew the data in the directory area 3. When a data corresponding to the telephone number in the callers area 2 is not present in the directory area 3, the telephone number and the number of placing calls of the number are newly added to the directory area 3. Thereafter, the numbers of placing calls of all the data in the callers area 2 are set to 0 at step S21.

By the above processing, the numbers of placing calls in the callers area 2 are added to the number of placing calls in the directory area 3. For example, the telephone number data shown in Table 2 are renewed to the data shown in Table 3. When the cursor key 68 is operated in succession to the renewal operation (step C18), the renewed telephone number data in the callers area 2 are displayed by the LCD 55. The user can confirm that the renewal has been made since the number of placing calls are 0. The telephone number displayed by the LCD 55 at that time can be used by operating the calling key 63 (step C20), and the processing can be stopped without placing any call by operating the end key 65 (step C24).

Like the first embodiment, when the operation of the calling key 63 is detected at step C20, the sub unit 5 performs the processing of steps C26 to C29. The base unit 1 receives the calling signal at step S18, and performs the processing of steps S23 to S27. Thereby, a call is placed. In this embodiment, the base unit 1 determines at step S29 whether the call is placed according to the callers function or not. When the call is placed according to the callers function, at step S30, the number of placing calls the telephone number in the callers area 2 is renewed by being increased by one. When the call is not placed according to the callers function, at step S31, whether the call is placed according to the directory function or not is determined. When the call is placed according to the directory function, at step S32, the number of placing calls of the telephone number in the directory area 3 is increased by one. When the call is not placed according to the caller or the directory function, i.e. when the call is placed by inputting a telephone number by means of the dial keys 62, whether the transmitted telephone number is present in the directory area 3 or not is determined at step S33. When it is present, the number of placing calls of the number is renewed at step S32. In the calling by inputting the telephone number by means of the dial keys 22 of the base unit 1, when the telephone number is present in the directory area 3, the number of placing calls of the number is renewed.

Thus, when a call is placed according to the callers function, the number of placing calls of the telephone number data in the callers area 2 is renewed by being increased by one, and at this time, the data in the directory area 3 is not renewed. In the calling according to the directory function and in the calling by inputting a telephone number, the number of placing calls of the data in the directory area 3 is renewed and the telephone number data in the callers area 2 is not renewed.

According to the telephone apparatus of this embodiment, the telephone number data stored in the base unit 1 can be accessed at any time, and the user can add the number of placing calls stored in the callers area 2 to the number of placing calls stored in the directory area 3 at any time.

The method of controlling the telephone number data in the callers area 2 and in the directory area 3 shown in the first and second embodiments may be employed not only for telephone apparatuses including the base and sub units but also for telephone apparatuses including only one unit.

Figure 9:
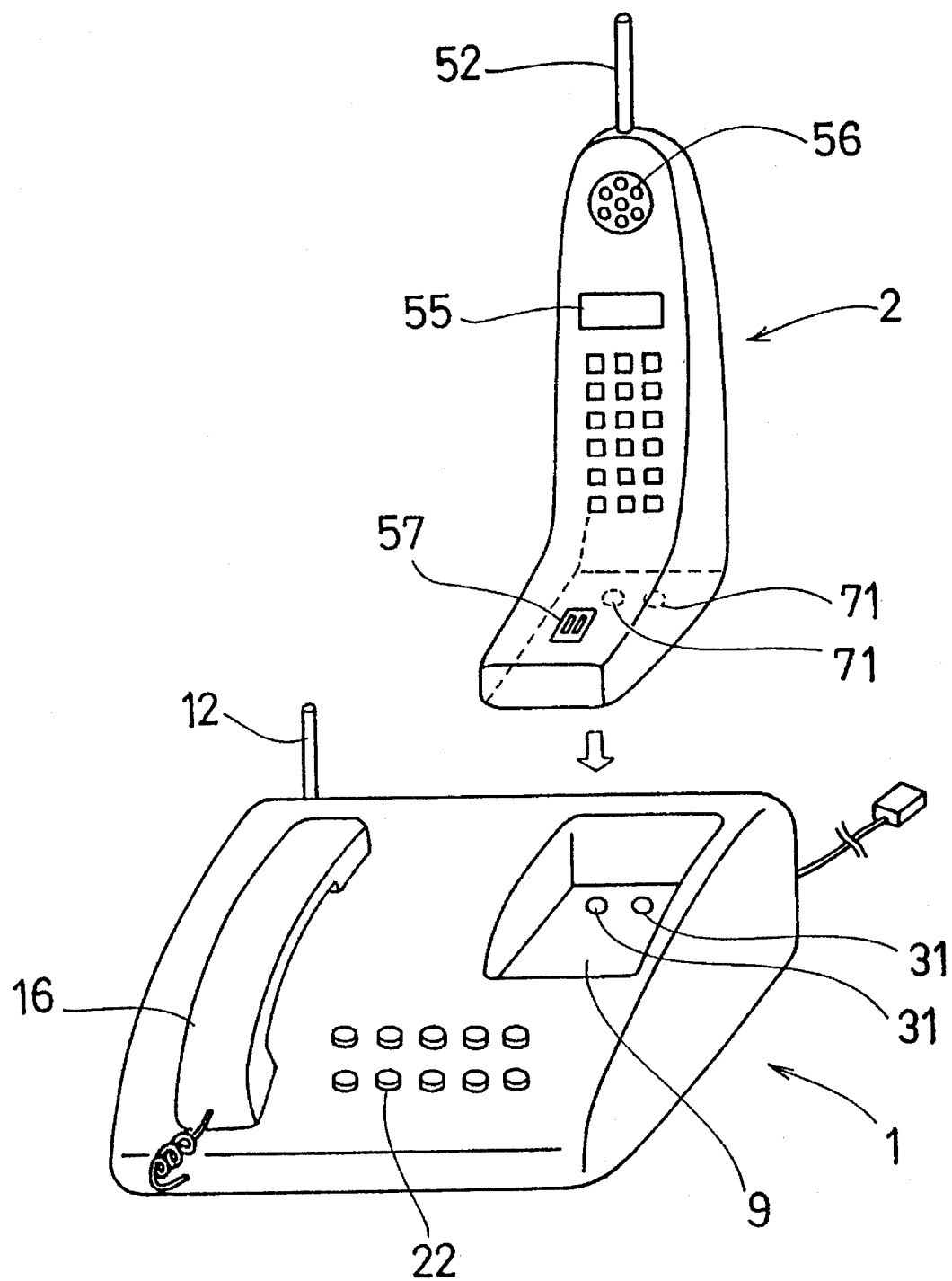
FIG. 9 is a projected perspective view showing a cordless telephone apparatus according to a third embodiment of the present invention.
Figure 10:
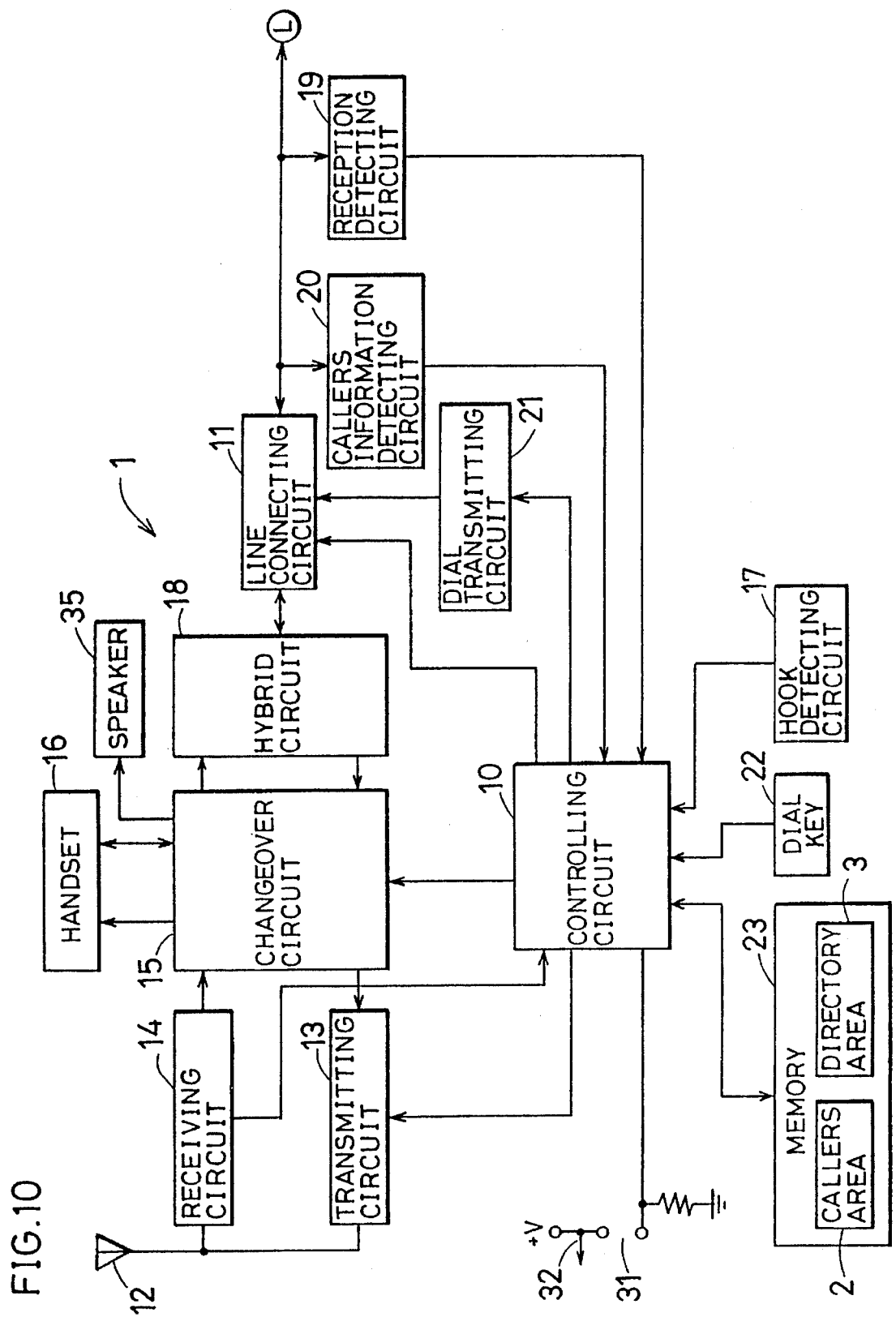
FIG. 10 is a block diagram showing the arrangement of the base unit in the third embodiment of the present invention.

The appearance of a cordless telephone apparatus of a third embodiment of the present invention is shown in FIG. 9. The arrangements of the base and sub units 1 and 5 are shown in the block diagrams of FIGS. 10 and 11, respectively. The base unit 1 of this embodiment includes the antenna 12, the transmitting circuit 13, the receiving circuit 14, the handset 16, the changeover circuit 15, the hybrid circuit 18, the line connecting circuit 11, the callers information detecting circuit 20, the reception detecting circuit 19, the dial transmitting circuit 21, the controlling circuit 10, the hook detecting circuit 17, the dial keys 22 and the memory 23 including the callers area 2 and the directory area 3. These elements are connected in a manner similar to the first embodiment shown in FIG. 1 and perform the same functions.

In addition to these elements, a terminal 31 for charging to the sub unit 5 is provided. Power from an external power source is supplied to the sub unit 5 through the charging terminal 31. The voltage at the charging terminal 31 is monitored by the controlling circuit 10. While the sub unit is being charged, a high-level signal is supplied to the controlling circuit 10. While the sub unit 5 is not being charged, a low-level signal is supplied. Electric power is supplied to the circuits of the base unit 1 from an arrow 32. The base unit 1 is provided with a speaker 35. The changeover circuit 15 connects the speaker 35 to the hybrid circuit 18 so that the user can monitor the voice of a received call without taking up the handset 16 from the base unit. Although not shown, the controlling circuit 10 is provided with a timer circuit for counting an elapsed time.

Figure 11:
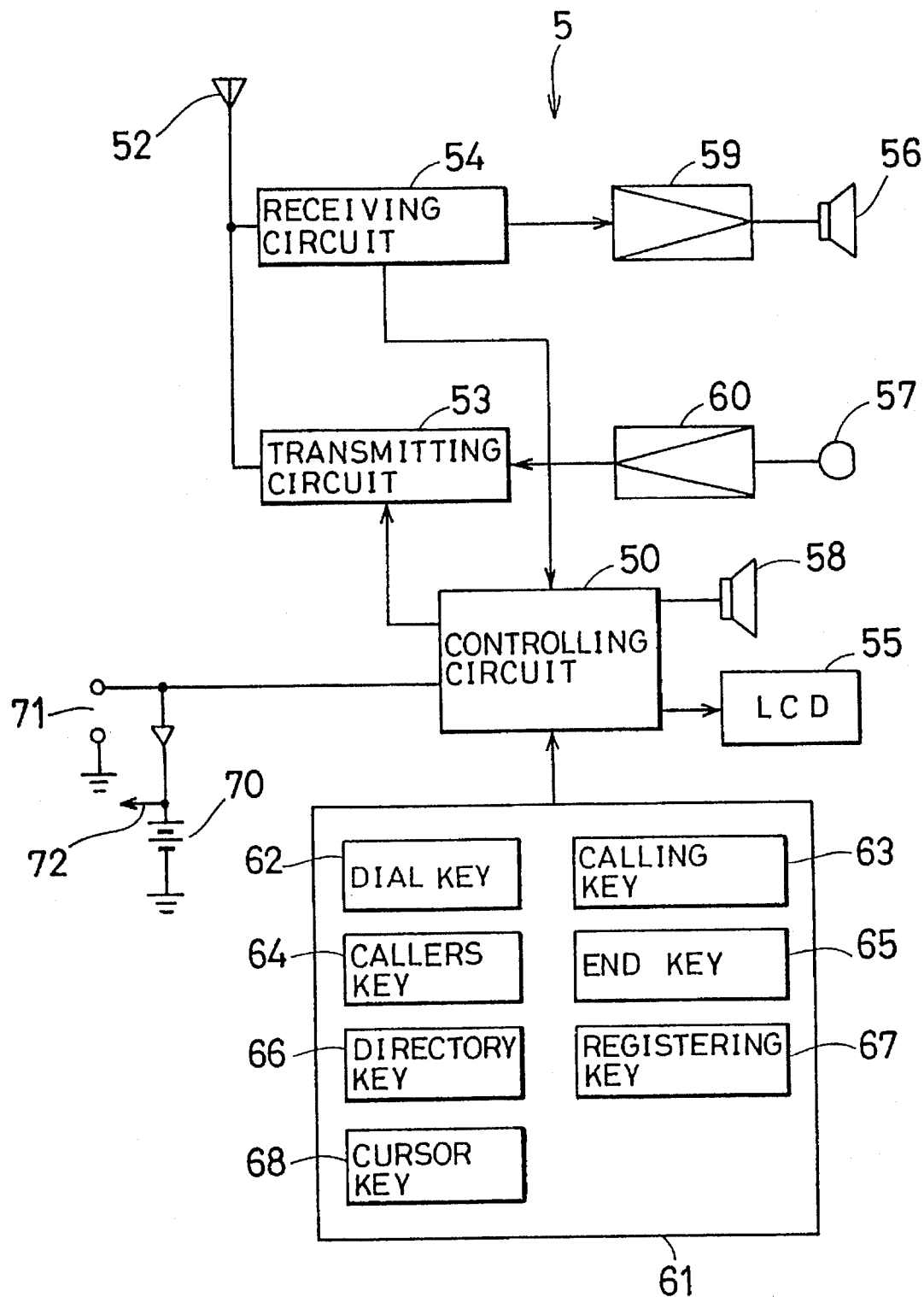
FIG. 11 is a block diagram showing the arrangement of the sub unit in the third embodiment of the present invention.

The sub unit 5 of FIG. 11 includes, like the sub unit 5 of FIG. 2, the antenna 52, the transmitting circuit 53, the receiving circuit 54, the amplifiers 59 and 60, the speaker 56, the microphone 57, the bell 58, the LCD 55 and the key circuit 61. These elements perform the same functions as those of the first embodiment. Further, the sub unit 5 is provided with a rechargeable battery 70 and a charging terminal 71 connected to the battery 70. By placing the sub unit 5 on a charging stand 9 of the base unit 1, the charging terminal 71 of the sub unit 5 and the charging terminal 31 of the base unit 1 are connected, so that the battery 70 is charged by the power from the base unit 1. In the sub unit 5, the power from the battery 70 is supplied to the circuits from an arrow 72 to drive the circuits. The battery 70 is charged while the sub unit 5 is placed on the base unit 1, so that the consumed power is supplemented.

The operations performed when a call is received and the operations performed when a call is placed with the sub unit 5 are the same as those of the first embodiment. In the first embodiment, the telephone number inputted by means of the dial keys 22 of the base unit 1 when a call is placed with the base unit 1 is always transmitted to the sub unit 5 and displayed by the LCD 55. In this embodiment, whether the input by means of the dial keys 22 of the base unit 1 is displayed or not is determined based on whether the sub unit 5 is placed on the base unit 1 or not.

Figure 12:
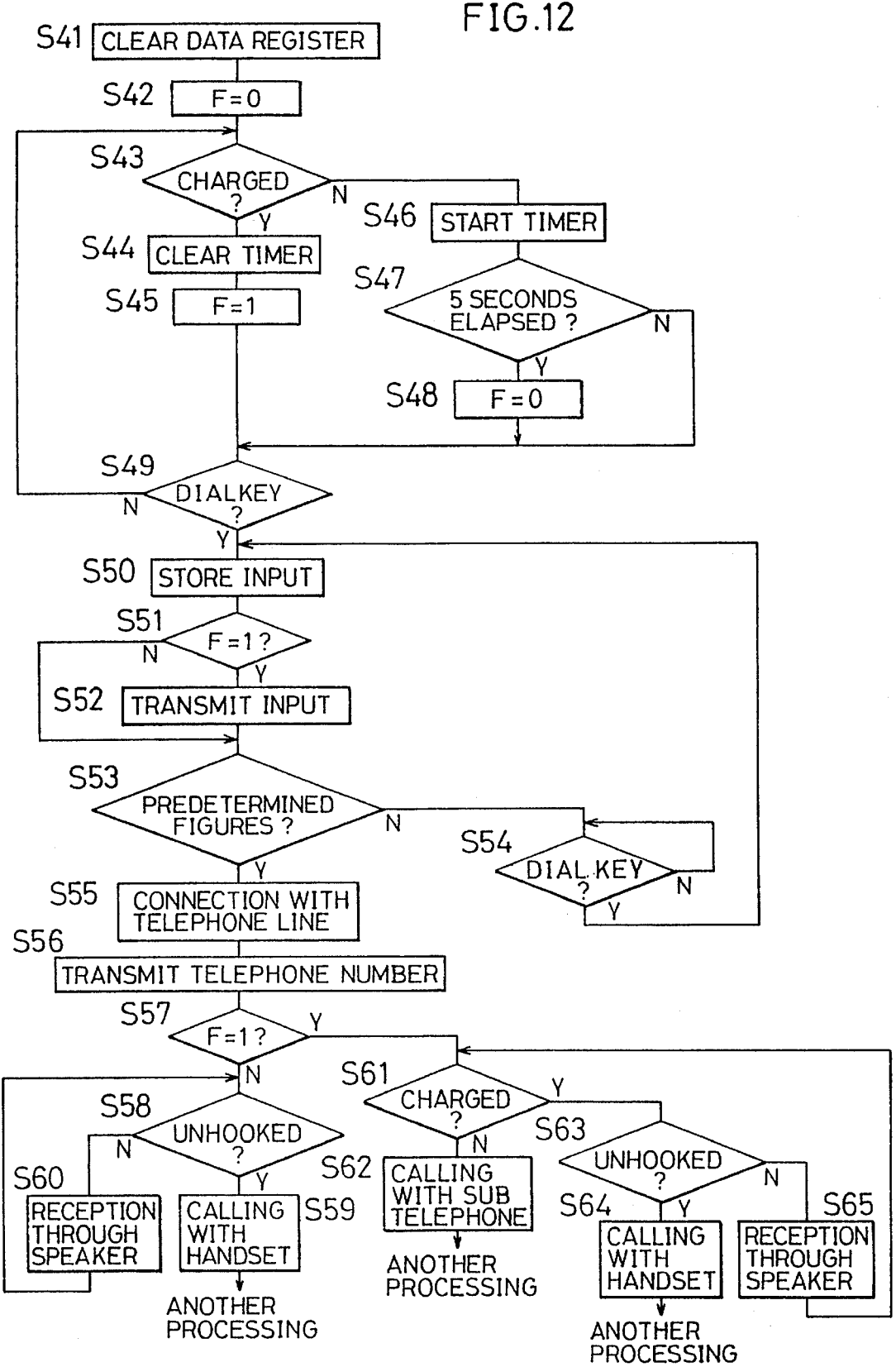
FIG. 12 is a flowchart of a processing performed by the base unit when a call is placed with the base unit in the third embodiment of the present invention.

Referring to FIG. 12, there is shown a flowchart of the processing performed by the base unit 1 when a call is placed with the base unit 1. First, at step S41, a data register for temporarily storing the numbers inputted by means of the dial keys 22 is cleared. Then, at step S42, a flag register F for storing information on whether the sub unit 5 is being charged or not is set to 0. Then, at step S43, the voltage at the charging terminal 31 is detected. At this time, when the controlling circuit 10 receives a high-level signal, the sub unit 5 is being charged, and when the controlling circuit 10 receives a low-level signal, the sub unit 5 is not being charged. When the sub unit 5 is being charged, the timer is cleared at step S44, and the flag register F is set to 1 at step S45. Then, the process proceeds to step S49. When the sub unit 5 is not being changed, the timer is started at step S46, and the elapsed time is detected based on an output of the timer at step 47. In this case, the timer has just been activated, and the process proceeds to step S49.

Then, at step S49, the operation of the dial keys 22 is detected. When there is no input by means of the dial keys the process returns to step S43, where whether the sub unit 5 is being charged or not is detected again. The process proceeds to step S46 again when the sub unit 5 is not being charged. However, when the timer has already been started, the started condition of the timer is maintained. The timer is started when it is cleared at step S44. When it is determined at step S47 that five or more seconds have elapsed, the flag register F is set to 0 at step S48. The processing from S43 through S49 is repeated until the first number of a telephone number is inputted by means of the dial keys 22. Thus, when the first number is inputted while the sub unit 5 is being charged, the flag register F is set to 1. The flag register F is also set to 1 when the first number is inputted within five seconds after the sub unit 5 is taken up from the base unit 1. In other cases, the following processing is performed with the flag register F being set to 0.

When a number is inputted at step S49, the number is stored in the data register at step S50. The setting of the flag register F is determined at step S51. When the flag register F is 1, the inputted number is transmitted to the sub unit 5 at step S52. The sub unit 5 receives the telephone number and causes the display 55 to display it. When the flag register F is 0, the process proceeds to step S53 without transmitting the input. At step S53, whether the telephone number has been inputted to predetermined figures or not is determined. When the input has not reached the predetermined figures, the process proceeds to S54 to wait for the next input. When a number is inputted by means of the dial keys 22, the process returns to step S50 to repeat the above-described processing. When it is determined at step S53 that the telephone number has been inputted to the predetermined figures, the line connecting circuit 11 is closed to make a connection with the telephone line L at step S55. Then, at step S56, the inputted telephone number stored in the data register is transmitted from the dial transmitting circuit 21.

Then, at step S57, the setting of the flag register F is detected. When the flag register F is 0, at step S58, whether the handset 16 is unhooked or not is determined based on an output of the hook detecting circuit 17. When the handset 16 is unhooked, at step S59, the changeover circuit 15 is controlled so that the handset 16 and the hybrid circuit 18 are connected, so that a call is made with the base unit 1. When the handset 16 is not unhooked, at step S60, the hybrid circuit 18 and the speaker 35 are connected by the changeover circuit 15, so that the call is monitored through the speaker 35. Then, the process returns to step S58.

When the flag register F is 1 at step S57, whether the sub unit 5 is being charged at that time or not is determined at step S61. When the sub unit 5 is not being charged, at step S62, the transmitting circuit 13 and the receiving circuit 14 are connected to the hybrid circuit 18 by the changeover circuit 15, so that a call is made with the sub unit 5. When the sub unit 5 is being charged, at step S63, whether the handset 16 is unhooked or not is detected by the hook detecting circuit 17. When the handset 16 is unhooked, a processing similar to that of step S59 is performed at step S64 so that a call is made with the base unit 1. When the handset 16 is not unhooked, a processing similar to that of step S60 is performed at step S65 so that the call is monitored through the speaker 35. Then, the process returns to step S61.

According to the above-described processing, when a call is placed with the sub unit 5 being placed on the base unit 1 or just after the sub unit 5 is taken up from the base unit 1, the telephone number inputted by means of the dial keys 22 of the base unit 1 is displayed by the LCD 55 of the sub unit 5. The user can confirm the inputted telephone number by looking at the display on the sub unit 5 at hand. When a call is placed with the base unit 1 without the sub unit 5 being placed on the base unit 1, the input by means of the dial keys 22 of the base unit 1 is not transmitted to the sub unit 5, so that the useless irradiation of the electric wave and the waste of electric power are prevented. Since the caller's telephone number is not displayed on the sub unit 5, the privacy of the user of the base unit 1 is protected.

Figure 13:
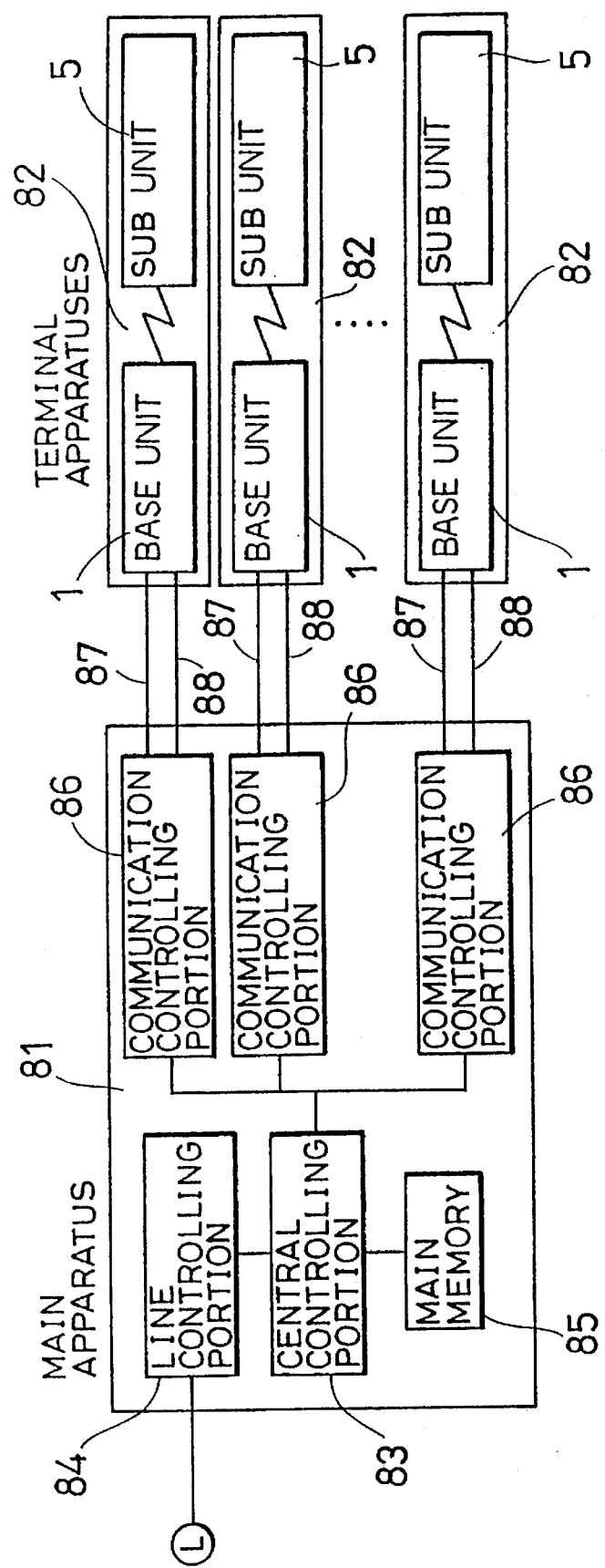
FIG. 13 is a block diagram showing the arrangement of a private telephone system according to a fourth embodiment of the present invention.

Referring to FIG. 13, there is shown the arrangement of a private telephone system using a cordless telephone apparatus according to a fourth embodiment of the present invention as a terminal apparatus. A main apparatus 81 of the private telephone system includes a central controlling portion 83, a line controlling portion 84, a main memory 85 and a plurality of communication controlling portions 86. The main apparatus 81 is connected to a public line L through the line controlling portion 84. To each of the communication controlling portions 86, a terminal telephone apparatus 82 including a base unit 1 and a sub unit 5 is connected. Between the communication controlling portion 86 and the base unit 1 of the terminal apparatus 82, a calling line 87 and a data line 88 are arranged, so that the transfer of a calling signal and a data signal can be performed between the terminal apparatus 82 and the main apparatus 81.

In the main memory 85, information on the entire private telephone system including information on the terminal telephone apparatuses 82 is stored. The central controlling portion 83 controls the line controlling portion 84 and the communication controlling portions 86 based on the information stored in the main memory 85. The information on the terminal apparatuses 82 stored in the main memory 85 includes telephone numbers, the condition of use as to whether the terminal apparatuses are busy or not and translating telephone numbers for translating a call received by a terminal apparatus to another terminal apparatus. Receivers' telephone numbers and communication records of the terminal apparatuses 82 such as the time of call are also stored.

As the terminal telephone apparatuses 82, the cordless telephone apparatus shown in the first or second embodiment is used. As shown in FIGS. 1 and 2, the base unit 1 and the sub unit 5 of the terminal apparatus 82 are connected by wireless, and the base unit 1 has a memory including the callers area and the directory area. Thus, a call can be made both with the base unit 1 and with the sub unit 5, and the caller function and the directory function can be used.

To make a call with an external apparatus to the terminal telephone apparatus 82 through the public line L, a telephone number particular to the terminal apparatus is transmitted. Receiving the telephone number, the central controlling portion 83 checks the condition of use of the terminal apparatus 82 stored in the main memory 85. When the terminal apparatus 82 is not busy, the communication controlling portion 86 to which the terminal apparatus 82 is connected is connected to the line controlling portion 84. Thereby, a reception signal is transmitted to the terminal apparatus 82. The caller's telephone number is transmitted to the terminal apparatus 82 together with the reception signal and stored in the callers area. When the call is started by the base unit 1 or the sub unit 5 of the terminal apparatus 82, the central controlling portion 83 stores in the main memory 85 that the terminal apparatus 82 is busy, and after the end of the call, the central controlling portion 83 stores in the main memory 85 that the terminal apparatus 82 is not busy.

When the terminal apparatus 82 is busy, the caller's telephone number is transmitted to the terminal apparatus 82 to store it in the callers area, and a busy signal is returned from the line controlling portion 84.

When the translating telephone number is stored in the main memory 85, a reception signal is transmitted to the terminal apparatus to which the call is translated, and the caller's telephone number is transmitted to the terminal apparatus which translates the call. Thereby, the callers information is stored in the terminal apparatus where the information should be stored, and the reception of the call by the terminal apparatus to which the call is translated is enabled. When the call is started, it is stored in the main memory 85 that the terminal apparatus to which the call is translated is busy.

The private telephone system is designed so that the calling between the terminal apparatuses 82 is possible. In this case, instead of the switching station in the telephone service facility, the central controlling portion 83 transmits the caller's telephone number. Thus, also in the extension call, the caller's telephone number is stored in the callers area.

The call made with the terminal apparatus 82 can be placed both with the base unit 1 and with the sub unit 5. To place a call with the base unit 1, a telephone number is inputted by means of the dial keys 22 shown in FIG. 1. To place a call with the sub unit 5, a telephone number is inputted by means of the dial keys 62 of FIG. 2 or the callers or the directory function is used. These calling operations are as described with reference to the first embodiment.

The data stored in the main memory 85 of the main apparatus 81 can be referred to from the terminal apparatuses 82 through the central controlling portion 83. Thereby, the communication record of the terminal apparatus 82 and the conditions of use of other terminal apparatuses can be found. A signal to request the reference to the main memory 85 from the terminal apparatus 82 and a data signal transmitted from the main apparatus 81 to the terminal apparatus 82 are transmitted through the data line 88. The data line 88 is provided separately from the calling line 87 for transmitting a calling signal, so that the data transfer can be performed even when the terminal apparatus 82 is busy. The data transmitted from the main apparatus 81 is displayed by the LCD 55 of the sub unit 5 of the terminal apparatus 82.

If a telephone apparatus like the conventional cordless telephone apparatus where the access from the sub unit to the base unit is inhibited when the base unit is busy is used in the private telephone system, the access from the sub unit to the main apparatus 81 will be impossible when the base unit is busy, and the data in the main memory 85 cannot be referred to from the sub unit 5. In the cordless telephone apparatus of the present invention, however, the access from the sub unit 5 to the base unit 1 is permitted even when the base unit 1 is busy, and the data in the main memory 85 can be referred to from the sub unit 5.

The callers area and the directory area may be provided not in the terminal apparatuses 82 but in the main memory 85. Since in the main apparatus 81, a large-capacity memory can be arranged and an external memory such as a disc apparatus can be provided, a large number of telephone number data can be stored in the callers and directory areas. In this case, these data are controlled not by the base unit 1 of each terminal apparatus 82 but by the central controlling portion 83. An identification code is provided to each terminal apparatus 82, and the telephone number data in the callers and directory areas are protected based on the identification codes of the terminal apparatuses 82. Specifically, to each data, an identification code corresponding to a terminal apparatus 82 is added, and only an access from the terminal apparatus 82 having the identification code is permitted. Thereby, secrecy is protected. Since the access from the sub unit 5 to the main apparatus 81 is possible even when the base unit 1 is busy, the operation as shown in the second embodiment to add the number of placing calls in the callers area to the number of placing calls in the directory area can be performed at any time.

Thus, the cordless telephone apparatus of the present invention is advantageous in the use as a terminal apparatus of a private telephone system.

Obviously, many modifications and variations of the present invention are possible in light of the above teachings. It is therefore to be understood that within the scope of the appended claims, the invention may be practiced other than as specifically described.

TABLE 1

| | Callers Area | | Directory Area | |
|---|---|---|---|---|
| Display Order | Telephone Number | Reception Time | Telephone Number | Number of Placing Calls |
| 1 | 0742-35-0002 | NOV. 01 11:30 | 03-3254-0001 | 21 |
| 2 | 06-364-0003 | OCT. 31 13:02 | 0742-35-0002 | 20 |
| 3 | 03-3377-0005 | OCT. 31 10:58 | 06-364-0003 | 13 |
| 4 | | | 082-227-0004 | 10 |
| 5 | | | 03-3377-0005 | 10 |
| 6 | | | 0720-75-0006 | 7 |
| 7 | | | 06-228-0007 | 5 |
| 8 | | | 0862-33-0008 | 3 |
| 9 | | | 03-3764-0009 | 2 |
| 10 | | | 06-312-0010 | 1 |

TABLE 2

| | Callers Area | | | Directory Area | |
|---|---|---|---|---|---|
| Display Order | Telephone Number | Reception Time | Number of Placing Calls | Telephone Number | Number of Placing Calls |
| 1 | 0742-35-0002 | NOV. 01 11:30 | 3 | 03-3254-0001 | 21 |
| 2 | 06-364-0003 | OCT. 31 13:02 | 1 | 0742-35-0002 | 20 |
| 3 | 03-3377-0005 | OCT. 31 10:58 | 2 | 06-364-0003 | 13 |
| 4 | | | | 082-227-0004 | 10 |
| 5 | | | | 03-3377-0005 | 10 |
| 6 | | | | 0720-75-0006 | 7 |
| 7 | | | | 06-228-0007 | 5 |
| 8 | | | | 0862-33-0008 | 3 |
| 9 | | | | 03-3764-0009 | 2 |
| 10 | | | | 06-312-0010 | 1 |

TABLE 3

| | Callers Area | | | Directory Area | |
|---|---|---|---|---|---|
| Display Order | Telephone Number | Reception Time | Number of Placing Calls | Telephone Number | Number of Placing Calls |
| 1 | 0742-35-0002 | NOV. 01 11:30 | 0 | 0742-35-0002 | 23 |
| 2 | 06-364-0003 | OCT. 31 13:02 | 0 | 03-3254-0001 | 21 |
| 3 | 03-3377-0005 | OCT. 31 10:58 | 0 | 06-364-0003 | 14 |
| 4 | | | | 03-3377-0005 | 12 |
| 5 | | | | 082-227-0004 | 10 |
| 6 | | | | 0720-75-0006 | 7 |
| 7 | | | | 06-228-0007 | 5 |
| 8 | | | | 0862-33-0008 | 3 |
| 9 | | | | 03-3764-0009 | 2 |
| 10 | | | | 06-312-0010 | 1 |

We claim:

1. A telephone apparatus comprising: first storing means including an area for storing therein a plurality of telephone numbers and numbers of placing calls corresponding to the telephone numbers; second storing means for storing at least a telephone number; a dial transmitting circuit for transmitting a telephone number to a telephone line; a display for displaying a telephone number; and a controlling circuit for reading out a telephone number from either of the first and the second storing means and for controlling the dial transmitting circuit to transmit the telephone number to the telephone line, said controlling circuit causing the first storing means to display the telephone numbers in an order of the number of placing calls, wherein said controlling circuit changes the number of placing calls of a telephone number stored in the first storing means which number is the same as a telephone number read out from the second storing means, based on calling by use of the telephone number read out from the second storing means.

2. A telephone apparatus comprising: detecting means for detecting a telephone number of a caller transmitted through a telephone line when a call is received; first storing means for storing a plurality of telephone numbers detected by the detecting means and first numbers of placing calls corresponding to the telephone numbers; a dial key; second storing means for storing a plurality of telephone numbers inputted by means of the dial key and second numbers of placing calls corresponding to the telephone numbers; a dial transmitting circuit for transmitting a telephone number to the telephone line; a display for displaying a telephone number; and a controlling circuit for reading out a telephone number from either of the first and the second storing means and for controlling the dial transmitting circuit to transmit the telephone number to the telephone line, said controlling circuit changing the number of placing calls in the storing means from which the telephone number is read out and causing the second storing means to display the telephone numbers in an order of the second number of placing calls, wherein said controlling circuit has a mode in which data in the first storing means are stored in the second storing means, and in the mode, when a same telephone number is present in the first and second storing means, the controlling circuit adds the first number of placing calls to the second number of placing calls.

* * * * *